UNITED STATES PATENT OFFICE.

ANDREW GORDON FRENCH, OF NELSON, BRITISH COLUMBIA, CANADA.

TREATMENT FOR THE PRECIPITATION OF ORE VALUES FROM THE EFFLUENT WATERS OF ORE CRUSHING AND CONCENTRATING PLANTS.

1,065,678.

Specification of Letters Patent. Patented June 24, 1913.

No Drawing. Application filed November 18, 1911. Serial No. 661,006.

*To all whom it may concern:*

Be it known that I, ANDREW GORDON FRENCH, citizen of the Dominion of Canada, residing at Nelson, in the Province of British Columbia, Canada, have invented a new and useful Treatment for the Precipitation of Ore Values from the Effluent Waters of Ore Crushing and Concentrating Plants, of which the following is a specification.

This invention relates to a means for the recovery of fine ore values, which, under a wet crushing treatment of any kind, are carried away in suspension in the water and slime.

In the wet crushing treatment the pulp or pulverized ore from stamps or rolls is carried by the water through the various processes devised for concentrating the ore and this water frequently carries high values in fine ore matter held in suspension, which particles are so fine that they take a long time to settle by gravitation. In the case of precious metals, the final recovery may be effected by chlorination or by cyaniding but in the application of these processes the water requires to stand for a considerable time in order that it may concentrate by settlement before the treatment by chlorination or cyaniding can be economically applied. In the case of the baser metals, zinc, lead, copper, etc., the waste is allowed to take place as the cost of recovery exceeds the saving effected.

It is to hasten the settlement of the ore values carried in this water that my invention has been devised.

The water that drains from the tailings is delivered, as at present, where any attempt is made to recover the values from this water into a series of settling tanks but as the work of settling, occupies a much shorter length of time, the tanks are relatively smaller. At the delivery of this water to the tanks, I add to it a very weak solution of gelatin or common glue and where the ore itself does not contain any soluble sulfates, I add to the solution of gelatin a small proportion of any metallic sulfate.

The solution, which I have found to give satisfactory results, consists of one part by weight of ordinary glue in two hundred and fifty parts of water and, where necessary, one part of sulfate of zinc, iron, copper or other suitable metallic sulfate and then dilute this to one-tenth strength with additional water making a mixed solution of one in two thousand five hundred. One gallon of this added to seventeen gallons of the effluent water from a gold, copper, lead or other ore crushing mill and gently stirred for a few seconds effects the rapid precipitation of the materials held in suspension. The time required to effect complete settlement in a tank containing six tons of effluent will not exceed more than five minutes. Furthermore, and this forms an important feature of the invention, the material so settled is in a condition more favorable to subsequent treatment by chlorination or cyaniding, where such is to be used.

The principle of the treatment lies in the fact that each particle becomes coated with an exceedingly thin film of a colloid substance consisting of an insoluble combination of the metallic salt and the gelatin and the particles so coated, losing their affinity for the water, sink rapidly to the bottom of the containing vessel.

Although the coating of each particle of ore matter is insoluble in water, forming as it does a colloid coating, it is penetrable by osmosis and where chlorination or cyaniding is required in subsequent treatment, the chlorin gas in the one case and the cyanid of potassium in the other will act upon the metals by endosmosis much more favorably than it does when these materials are associated with water in solution as is the case when the colloid coating, and again the dissolved metal escapes by exmosis quickly into the solution.

Having now particularly described my invention and the manner of its application, I hereby declare that what I claim as new and desire to be protected in by Letters Patent, is:

1. The process of precipitating solids in liquids which consists in adding to water containing solids in suspension, a dilute solution of gelatin to form a colloid film over the suspended particles.

2. The process of precipitating mineral matter held in suspension, which consists in adding to water containing the mineral matter in suspension, a dilute solution of gelatin and a soluble sulfate of a metal, substantially as specified.

3. The process of precipitating mineral matters held in suspension in liquids which consists in adding to seventeen parts of the water containing the mineral matters in suspension, one part of a mixed solution of gelatin and a sulfate of a metal in the proportion of one part of gelatin and sulfate in 2500 parts of water, and then stirring the mass substantially as specified.

In testimony whereof I have signed my name to this specification in the presence of the two subscribing witnesses.

ANDREW GORDON FRENCH.

Witnesses:
S. S. JARVIS,
W. F. TEETZEL.